INVENTOR.
LEON PAUL ERDMAN

INVENTOR.
LEON PAUL ERDMAN

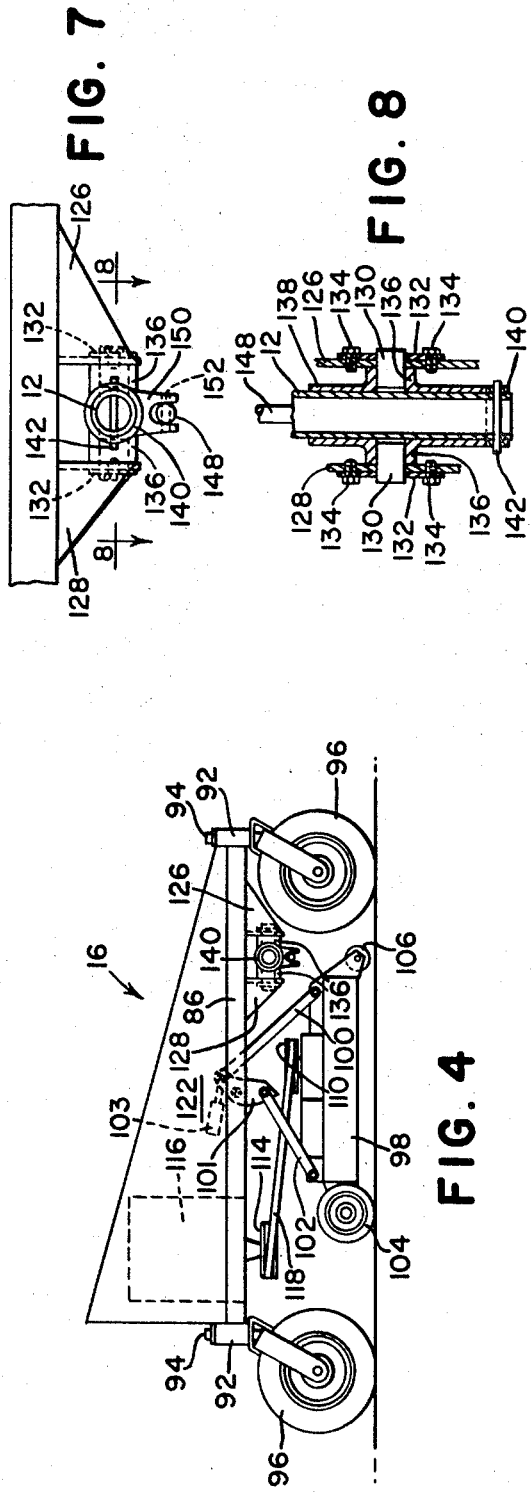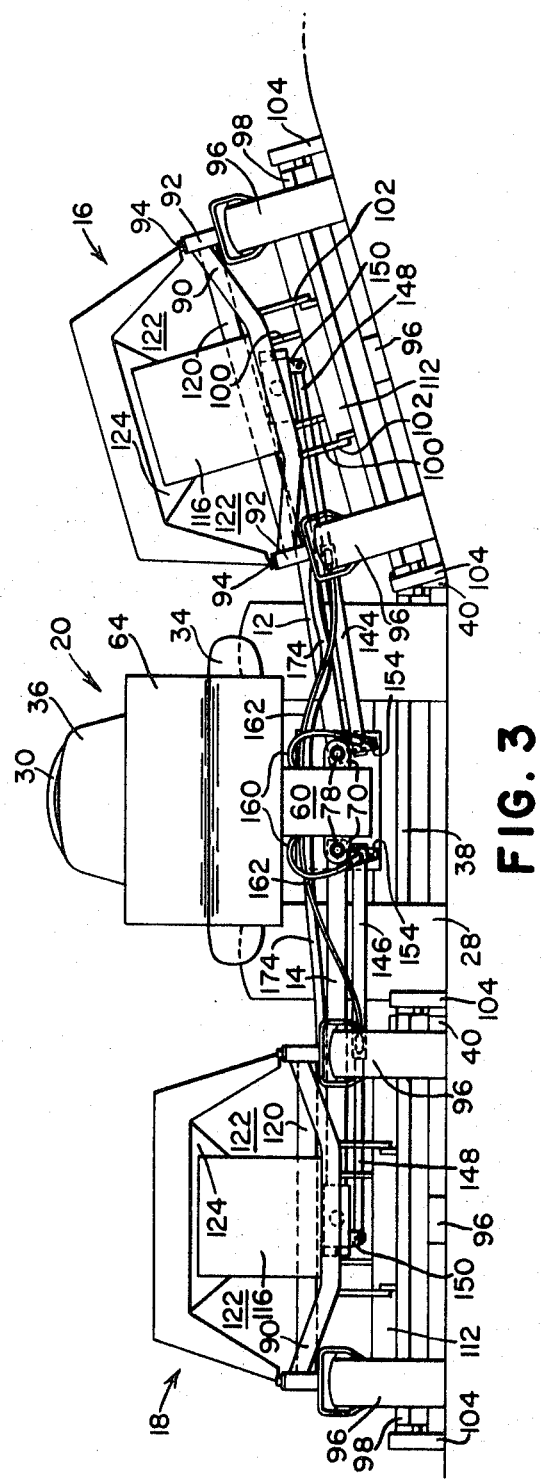

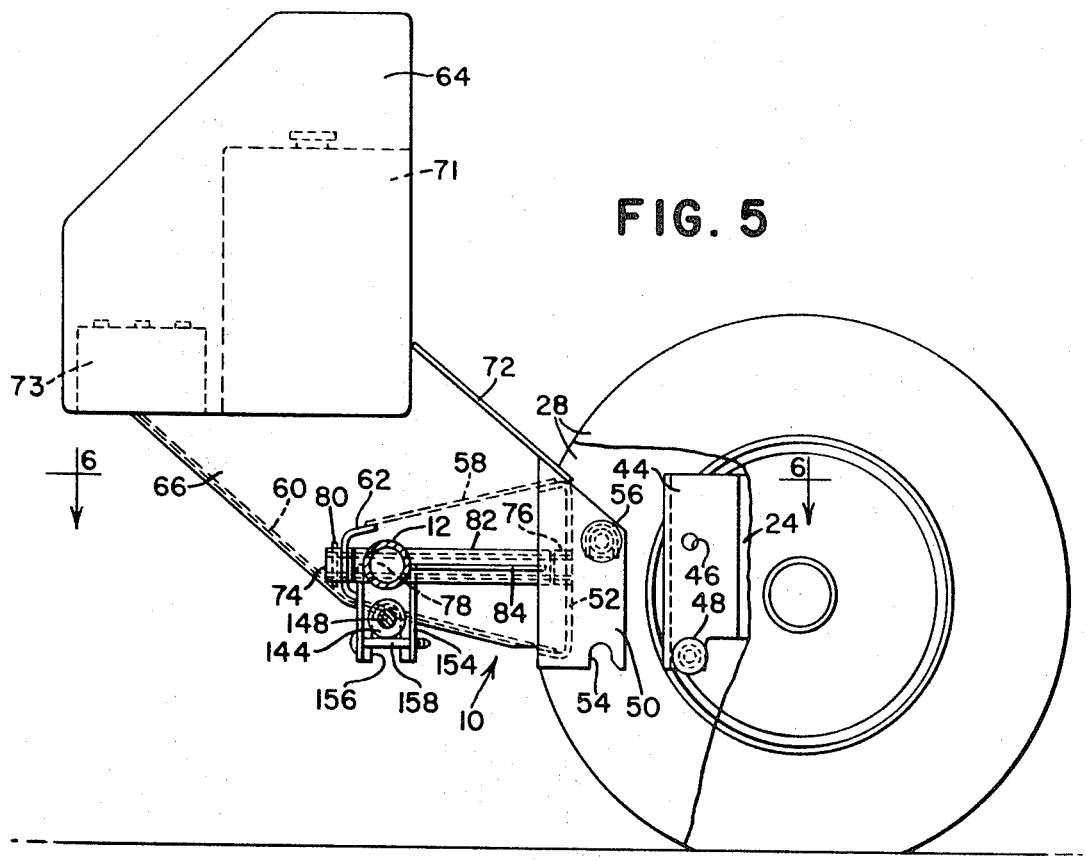
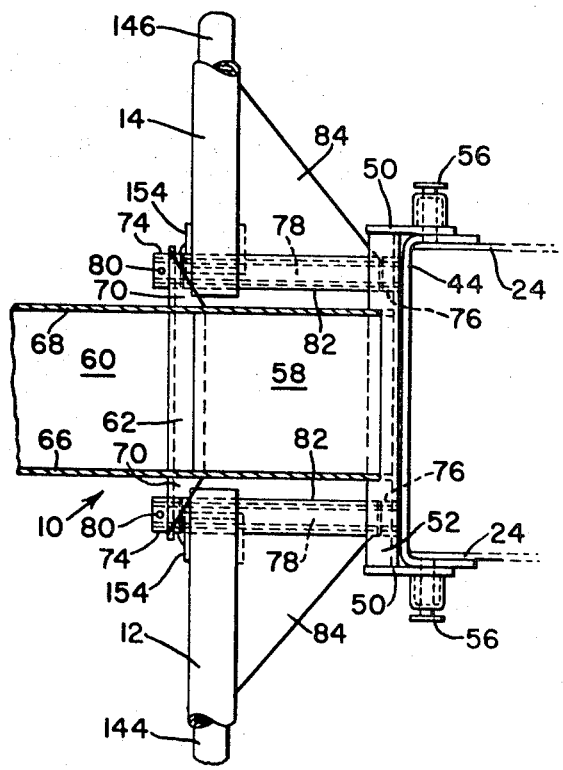

United States Patent Office 3,608,284
Patented Sept. 28, 1971

3,608,284
GANG MOWER
Leon Paul Erdman, Beaver Dam, Wis., assignor to
Deere & Company, Moline, Ill.
Filed Apr. 9, 1970, Ser. No. 26,984
Int. Cl. A01d 75/30
U.S. Cl. 56—6                                    16 Claims

ABSTRACT OF THE DISCLOSURE

A gang mower assembly is connected to a lawn and garden tractor having a rotary mower suspended therebeneath and includes a draft frame rigidly connected to the rear of the tractor, a pair of transversely extending draft tubes pivotally connected to the opposite sides of the draft frame for vertical pivoting movement and a pair of wheeled rotary mower units articulately connected to the draft tubes for vertical pivoting movement about the draft tubes and rocking movement about fore-and-aft extending axes. The mower assemblies are slidable along the draft tubes and power means are provided to move the mower assemblies between extending working positions and retracted transport positions.

BACKGROUND OF THE INVENTION

The present invention relates generally to mowers and more particularly relates to gang mowers for maintaining lawns.

Gang mowers are often used to maintain large lawns such as those found on many estates and the fairways on golf courses since they materially reduce the time needed to cover a given area. Because of the width of a gang mower, it is necessary that it have a high degree of flexibility so that it can conform to the contour of the terrain over the entire width of the mower to provide for uniformity of cut and present scalping regardless of the contour of the terrain. However, it is also necessary that the mower units of a gang mower be semi-rigid with the propelling vehicle so that they properly track the propelling vehicle when cornering or when working on hillsides. If the individual mower units do not properly track the propelling vehicle, they will leave strips of uncut grass.

It is also necessary that the overall width of gang mowers be variable so that the mower can work in restricted areas such as between trees, and it should be possible to reduce the width without making one or more of the mower units inoperative.

SUMMARY OF THE INVENTION

It is an object of the present invention to provide a gang mower which has a high degree of flexibility and yet is semi-rigid with the propelling vehicle so that the individual mower units accurately track the propelling vehicle.

An additional object of the present invention is to provide a gang mower in which the width can be varied while on the go and without making one or more of the mower units inoperative.

A further object of the present invention is to provide a gang mower in which the outermost mower units can work under trees which have branches lower than the height of the mower units without becoming entangled with the trees.

A still further object of the present invention is to provide a gang mower having a plurality of rotary mower units which are individually powered and controlled so that any one or more of the mower units can be operated without the simultaneous operation of the other mower units.

Yet another object of the present invention is to provide a gang mower having a hitch which rigidly attaches to conventional lawn and garden tractors so that the conventional mower suspended beneath the lawn and garden tractor forms part of the gang mower.

The above objects and additional objects and advantages will become apparent along with the details of construction of a preferred embodiment of the invention from a reading of the following detailed description when taken in conjunction with the accompanying drawings.

BRIEF DESCRIPTION OF THE DRAWINGS

In the drawings:
FIG. 3 is a rear elevational view of the gang mower with one of the outermost mower units working on a side hill;
FIG. 4 is a side elevational view of one of the mower units;
FIG. 5 is an enlarged sectional view taken substantially along the lines 5—5 of FIG. 1, but having the gang mower hitch removed from the tractor;
FIG. 6 is a view taken substantially along the line 6—6 of FIG. 5, but having the gang mower hitch attached to the tractor;
FIG. 7 is an enlarged side elevational view of the connection between one of the outermost mower units and the gang mower hitch;
and
FIG. 8 is a sectional view taken substantially along the lines 8—8 of FIG. 7.

DETAILED DESCRIPTION OF THE PREFERRED EMBODIMENT

Figure 1:
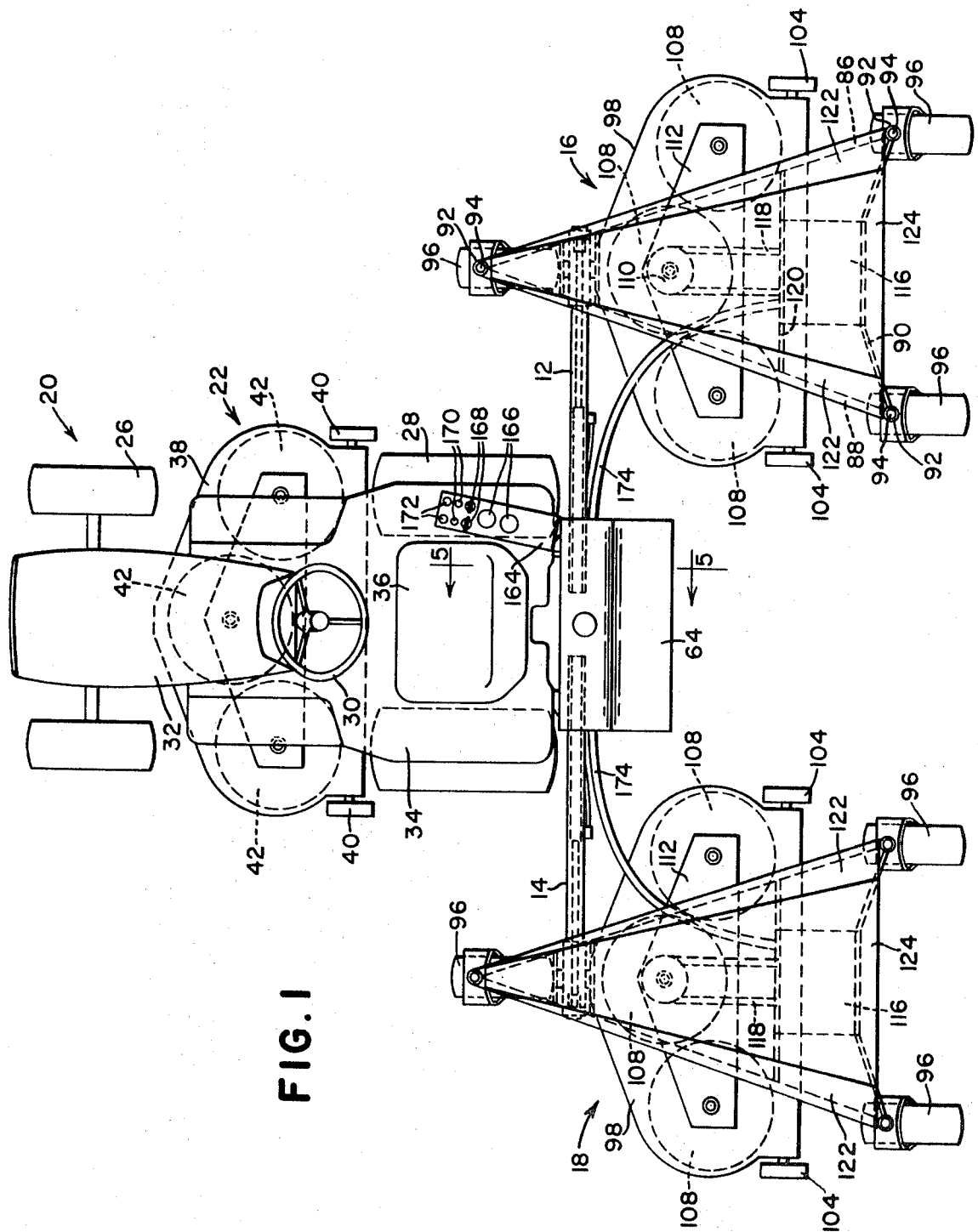
FIG. 1 is a top plan view of a gang mower constructed in accordance with the principles of the present invention, the outermost mower units being shown in their fully extended positions.

In the following description, right- and left-hand are determined by standing at the rear of the implement and looking in the direction of travel.

With reference now to the drawings, the gang mower assembly according to the present invention has a gang hitch including a draft frame indicated generally at 10 (see FIGS. 5 and 6), a pair of draft tubes 12 and 14, and right- and left-hand mower units indicated generally at 16 and 18, respectively. The gang mower assembly is attached to a lawn and garden tractor indicated generally at 20 which has a rotary mower indicated generally at 22 suspended therebeneath.

The illustrated tractor is a conventional lawn and garden tractor and includes a main frame or chassis 24 which is mounted on front steerable wheels 26 and rear traction wheels 28. Wheels 26 are controlled by a conventional steering wheel 30 and the rear wheels 28 are powered by an engine 32 mounted on the forward end of the chassis 24. An operator's deck 34 is mounted on the rear portion of the chassis 24 and carries an operator's seat 36. The rotary mower 22 is of conventional structure and includes a housing 38 which is provided with a pair of antiscalping wheels 40 and carries a plurality of cutter blades 42. The mower unit 22 is suspended from the chassis 24 in a conventional manner and is also drivingly connected to the engine 32 in a conventional manner. The details of the suspension and drive train for the rotary mower 22 form no part of the present invention, but for a full illustration and description of the same, reference can be had to U.S. Pat. No. 3,503,189 which issued to L. P. Erdman on Mar. 31, 1970.

For the purpose of securing the draft frame 10 of the secured to the rear portion of the chassis 24. Each leg of gang mower hitch to the tractor 20, a U-plate 44 is the U-plate 44 is provided with an aperture 46 in an upper portion thereof and a headed stud 48 positioned below and vertically aligned with the aperture 46. The stud 48 and aperture 46 serve to mount the draft frame 10. The forward portion of the draft frame 10 includes a pair of spaced vertically extending plates 50 which are interconnected by a channel member 52. The lower portion of each plate 50 is provided with a downwardly open slot 54 which is adapted to receive the headed stud 48 when the plates 50 are placed alongside the legs of the U-plate 44. The upper portion of each plate 50 carries a spring-loaded pin 56 which is normally biased inwardly and which is adapted to extend into the apertures 46 provided in the legs of the U-plate 44. The draft frame 10 is rigidly secured to the chassis of the tractor 20 by placing the notches 54 over the studs 48, pulling the pins 56 and aligning them with the apertures 46, and releasing the pins 56 so that the springs push the pins 56 into the apertures 46.

A pair of upper and lower panels or plate members 58 and 60 have their forward ends secured to the legs of the channel member 52 and converge rearwardly therefrom. The rear end of the upper panel 58 is secured to the upper leg of a rear channel member 62 while an intermediate portion of the lower panel 60 is secured to the bottom leg of the rear channel member 62. The lower panel 60 extends upwardly and rearwardly from the channel member 62 to form the lower wall of a support for a utility box 64. A pair of vertically extending side panels 66 and 68 have their forward ends secured to the forward channel member 52 and are also secured to the edges of the upper and lower panels 58 and 60. The side panels 66 and 68 are provided with suitable openings through which the ends 70 of the rear channel member 62 extend. The side panels 66 and 68 form side walls of the support for the utility box 64 and have their upper edges interconnected by an additional panel 72. The utility box 64 carries a gas tank 71 and battery 73 (see FIG. 5) for the engines of mowers to be described hereinafter.

The bight portion of the projecting ends 70 of the rear channel member 62 are provided with openings which are reinforced by sleeves 74 and the bight portion of the front channel member 52 is provided with similar openings reinforced by sleeves 76. The sleeves 74 and 76 are aligned in a fore-and-aft direction and receive shafts 78 which pivotally mount the right- and left-hand draft tubes 12 and 14. The shafts 78 are retained in position in the sleeves 74 and 76 by pins 80 which extend through openings provided in the sleeves 74 and the shafts 78.

A sleeve 82 is secured to the inner end of each of the draft tubes 12 and 14 and these sleeves 82 are journaled on the shafts 78 so that the draft tubes 12 and 14 can pivot in a generally vertical plane transverse to the direction of tractor travel. Gusset plates 84 extend between the sleeves 82 and draft tubes 12 and 14 to reinforce the connection between the draft tubes and sleeves.

The right- and left-hand mower units 16 and 18 are identical so only the right-hand unit will be described, although a few parts of the left-hand unit 18 will be identified by the same reference numerals used to identify the parts of the right-hand unit 16. The mower unit 16 includes a rigid generally triangular-shaped frame having rearwardly diverging frame members 86 and 88 which have their rear ends interconnected by a rear frame member 90. A sleeve 92 is secured to each corner of the triangular-shaped frame and receives the shaft 94 of a caster wheel assembly 96. A mower housing 98 is tractively coupled to and suspended beneath the triangular-shaped frame by front and rear pairs of rigid links 100 and 102 which have their upper ends pivotally connected to a crank 101. The crank 101 can be rotated by a hydraulic cylinder 103 to raise and lower the mower housing. The cylinder 103 is connected to a conventional hydraulic function on the tractor 20 by an undisclosed hydraulic line. It should be noted that the cylinders 103 on the mower units 16 and 18 may be connected to separate hydraulic functions so the mower housings can be individually raised and lowered, may be connected to the same function so that the housings are raised and lowered simultaneously, or may be connected to the hydraulic function to which the cylinder for the tractor-mounted mower 22 is connected so that all three mower housings are simultaneously raised and lowered. In addition to the links 100 and 102, and mower housing 98 is also supported by gauge wheels 104 during normal operation and is further provided with a front anti-scalping roller 106. A plurality of blades 108 are rotatably mounted within the mower housing 98 and are all interconnected with a main drive sheave 110 by belts or the like which are enclosed within a drive housing 112. The main drive sheave 110 is interconnected with a drive sheave 114 on an engine 116 by an endless flexible belt 118. The engine 116 is mounted on the rear frame member 90 and an intermediate frame member 120 which extends between the side frame members 86 and 88.

Each mower unit is provided with a protective cover which includes a pair of side walls 122 which are generally of triangular shape and slant inwardly and upwardly, and an upper wall 124 which is also triangular-shaped and is secured to the upper edges of side walls 122. It can thus be seen that the housing is tapered from the rear to the front and from the bottom to the top so that if the mower unit is directed under low-hanging tree branches, the pointed front end of the housing should be able to move under the tree branches so that the branches are pushed upwardly as the mower unit progresses under the branches. In this manner, the branches are prevented from striking the engine or any other vulnerable part of the mower unit.

The mower units are pivotally connected to the draft tubes 12 and 14 by coupling means best illustrated in FIGS. 7 and 8. The coupling means for each mower unit includes a pair of fore-and-aft spaced transverse brackets 126 and 128 which are secured to forward portions of the side frame members 86 and 88 and depend therefrom. Brackets 126 and 128 are provided with fore-and-aft aligned apertures which receive pivot pins 130. Pivot pins 130 are retained within the apertures provided in brackets 126 and 128 by retainer plates 132 which are integrally secured to the outer ends of the pivot pins 130 and releasably secured to the brackets 126 and 128 by bolts 134. The pivot pins 130 also extend into journal blocks 136 secured to opposite sides of a sleeve 138 which is slidably and rotatably mounted on its respective draft tube. Removal of the sleeve 138 from its draft tube is prevented by a collar 140 secured to the outer end of the draft tutbe by a pin 142.

From the drawings and the foregoing description, it can be seen that the outer mower units of the gang mower can follow the ground contour by pivoting vertically about the axes of the sleeves 138 and by rocking about the pins 130. However, in the longitudinal direction, the outer mower units are rigid with the tractor since there is no vertical pivot about which they can move. Since the outer mower units are rigid with the tractor in a longitudinal direction, they accurately trail the tractor and leave no uncut strips of grass when cornering or working on hillsides.

Figure 2:
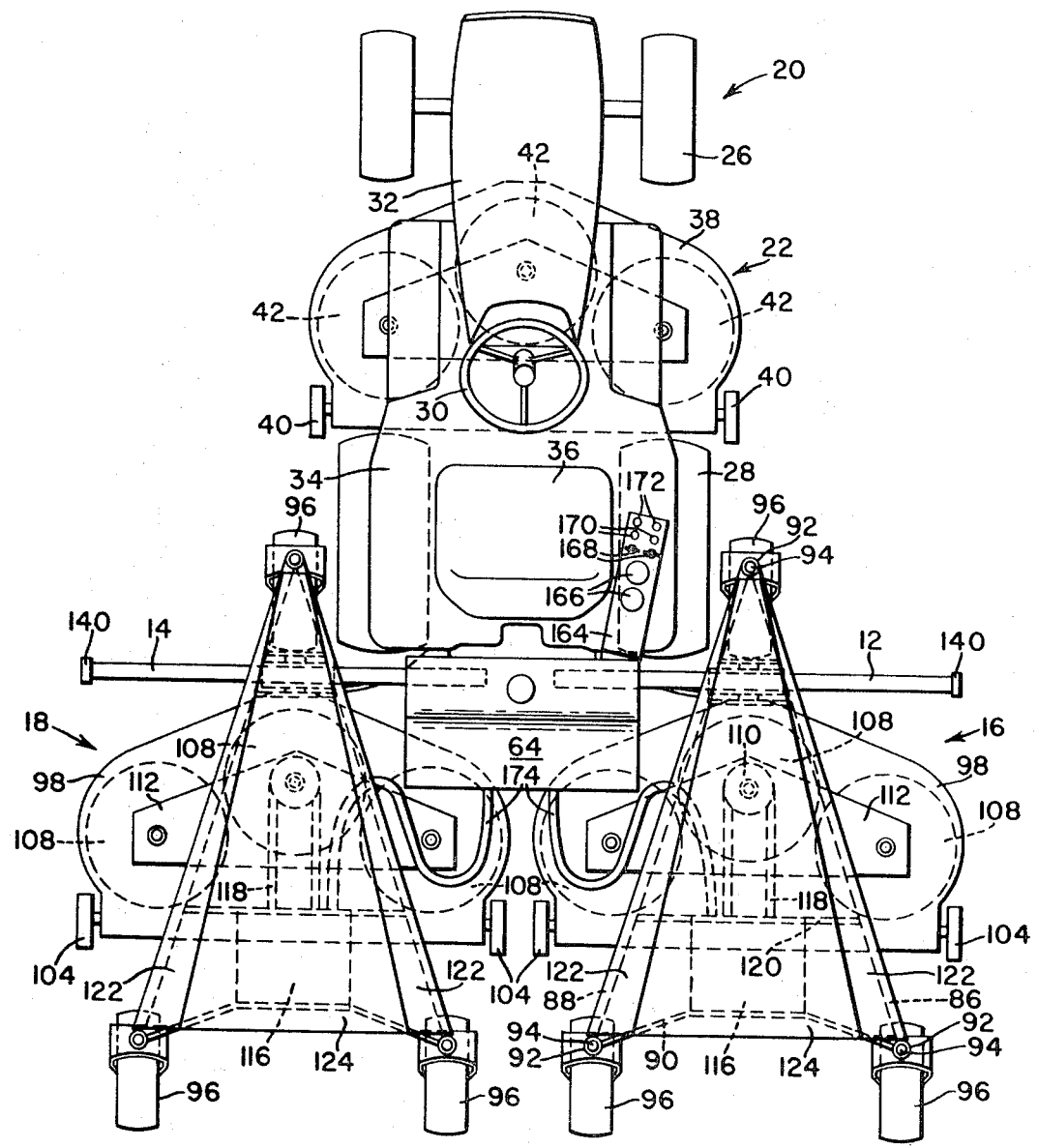
FIG. 2 is a view similar to FIG. 1, but illustrating the outermost mower units in their fully retracted positions.

The mower units 16 and 18 can be moved between a normal working position illustrated in FIGS. 1 and 3 and a transport position illustrated in FIG. 2 by right and left hydraulic cylinders 144 and 146. Each of the hydraulic cylinders is provided with an extensible and retractable piston rod 148 which is secured to a bracket 150 by a pin 152. The brackets 150 are secured to and depend from the sleeve 138.

The anchor end of each of the cylinders is secured to a bracket 154 which is secured to and depends from the inner end of the draft tube. Each of the brackets 154 is provided with a downwardly open slot 156 and the legs which define the slot 156 extend into a groove provided in the anchor end of the corresponding cylinder. Each cylinder is retained in its respective slot by a pin 158. The anchor and rod ends of each cylinder 144 and 146 are interconnected with conventional remote cylinder outlets on the tractor by fluid lines 160 and 162 so that the cylinders can be controlled with conventional hydraulic controls on the tractor. Under normal working conditions, the hydraulic cylinders 144 and 146 will be extended so that the mower units 16 and 18 are in the positions illustrated in FIGS. 1 and 3. However, when working in restricted areas such as between trees, either one or both of the mower units 16 and 18 can be moved inwardly by retraction of its associated hydraulic cylinder so that the overall width of the gang mower is reduced. If the gang mower is to be moved along a public road, both hydraulic cylinders can be retracted to move the mower units 16 and 18 to their transport position illustrated in FIG. 2 so that the total width of the gang mower is within legal limits.

A control console 164 for the mower units 16 and 18 is mounted on and projects forwardly from the utility box 64 so that, when the draft frame is secured to the tractor, the control console 164 extends up along side the operator's seat 36. The control console carries conventional gauges 166 such as ammeters and tachometers, keys 168, electric clutch switches 170 for the mower units 16 and 18, and indicator lights for the clutches. The connections between the instruments and controls on the control console 164 and the respective mower unit extend through flexible protective hoses 174 which may also carry the gas lines and battery cables for the engines 116 as well as the hydraulic lines for the hydraulic cylinders 103.

From the drawings and foregoing description, it can be seen that the present invention provides a gang mower which is easily attached to a conventional lawn and garden tractor, has a high degree of flexibility and yet accurately tracks the tractor, and is easily adjustable in width.

While only a single preferred embodiment of the invention has been described and illustrated, various modifications within the spirit and scope of the invention will become apparent to those skilled in the art and can be made without departing from the underlying principles of the invention. Therefore, the invention should only be limited by the following claims.

What is claimed is:

1. A gang mower comprising: a tractor having a mower tractively coupled therebeneath; a draft frame secured to the tractor; a pair of transversely extending draft beams pivotally connected to the opposite sides of the draft frame for vertical pivoting movement about fore-and-aft extending axes; a pair of wheeled mower units; means articulately and tractively coupling one of the mower units to each of the draft beams; each of the coupling means being slidably mounted on its respective draft beam; and means for varying the position of each coupling means on its respective draft beam and the position of each mower unit with respect to the tractor.

2. The gang mower set forth in claim 1 wherein the means to vary the position of each coupling means on its respective draft beam includes a pair of double-acting extensible and retractable hydraulic cylinders, each cylinder being anchored between one of the coupling means and the corresponding draft beam.

3. A gang mower comprising: a tractor having a mower tractively coupled therebeneath; a draft frame rigidly coupled to the rear of the tractor; a pair of draft beams extending generally transversely to the direction of tractor travel and connected to the opposite sides of the draft frame for vertical pivoting movement about axes extending generally parallel to the direction of tractor travel; a pair of wheeled mower units; and coupling means articulately connecting one of the mower units to each of the draft beams for vertical pivotal movement about an axis extending generally transversely to the direction of tractor travel and rocking movement about an axis generally parallel to the direction of tractor travel.

4. The gang mower set forth in claim 3 wherein each of the coupling means is slidably mounted on its respective draft beams, and means are provided to maintain each of the coupling means in any one of a plurality of adjusted positions along its associated draft beam.

5. The gang mower set forth in claim 4 wherein the means to maintain each of the coupling means in any one of a plurality of adjusted positions along its associated draft beam includes a pair of extensible and retractable hydraulic cylinders, each cylinder being anchored between one of the coupling means and the inner end of the associated draft beam.

6. For use with a tractor having a mower tractively coupled therebeneath, a gang mower assembly comprising: a draft frame rigidly securable to the tractor; a pair of generally transversely extending draft tubes connected to opposite sides of the draft frame for vertical pivoting movement about fore-and-aft extending axes; a pair of wheeled mower units; coupling means connecting one of the mower units to each of the draft tubes for vertical pivotal movement about a generally transversely extending axis and rocking movement about a generally fore-and-aft extending axis; each of the coupling means being slidably mounted on its respective draft tube; and means operatively coupled between each draft tube and its respective coupling means to forceably slide each coupling means along its respective draft tube to any desired position between a normal working position and a transport position.

7. The combination set forth in claim 6 wherein each of the means for forceably sliding the coupling means along their respective draft tubes includes an extensible and retractable hydraulic cylinder having one end connected to the inner end of its associated draft tube and its opposite end connected to its associated coupling means.

8. The combination set forth in claim 7 wherein each of the coupling means includes a pair of spaced, fore-and-aft aligned brackets secured to and depending from the wheeled mower unit, and a transversely extending sleeve mounted between the brackets for rocking movement about a generally fore-and-aft extending axis, the sleeve being slidably and rotatably mounted on the draft tube.

9. For use with a tractor having a driven mower tractively coupled therebeneath, a gang mower assembly comprising: a draft frame rigidly securable to the rear of the tractor; a pair of draft beams extending generally transversely to the direction of tractor travel and connected to the opposite sides of the draft frame for vertical pivoting movement about axes extending generally parallel to the direction of tractor travel; a pair of mower units each including a generally triangular-shaped frame having each corner supported on a wheel and positioned to have a leading corner, an engine mounted on a rear portion of the frame, a driven mower tractively coupled beneath the frame, means providing a driving connection between the engine and driven mower, and a protective covering having a triangular-shaped upper surface and a pair of triangular-shaped side walls each having one corner adjacent the forward corner of the frame; and coupling means articulately connecting the forward corner of one of the mower units to each of the draft beams for vertical pivoting movement of the mower units about an axis extending generally transversely to the direction of tractor travel and rocking movement about axes generally parallel to the direction of tractor travel.

10. The combination set forth in claim 9 wherein the upper surface of the protective covering of each mower unit is inclined upwardly and rearwardly, and the side walls of the protective covering of each mower unit converge upwardly.

11. The combination set forth in claim 10 wherein each of the coupling means is slidably mounted on its respective draft beam, and means are provided to forceably slide each coupling means along its respective draft beam to any desired position between a normal working position and a transport position.

12. The combination set forth in claim 11 wherein each of the coupling means includes a pair of spaced, fore-and-aft aligned brackets secured to and depending from the forward portion of the mower unit frame, and a transversely extending sleeve slidably and rotatably mounted on the draft beam and pivotally mounted between the pair of brackets for rocking movement about a generally fore-and-aft extending axis, and each of the means for forceably sliding the coupling means along their respective draft beams includes an extensible and retractable hydraulic cylinder having opposite ends connected to a draft beam and sleeve.

13. The combination set forth in claim 10 wherein a common gas tank for the engines of the mower units is carried on the draft frame and is interconnected with the engines by flexible conduits.

14. For use with a tractor having a driven mower tractively coupled therebeneath, a gang mower assembly comprising: a draft frame rigidly securable to the rear of the tractor; a pair of draft beams extending generally transversely to the direction of tractor travel and connected to the opposite sides of the draft frame for vertical pivoting movement about axes extending generally parallel to the direction of tractor travel; a pair of mower units each including a wheeled frame, an engine mounted on the frame, a driven mower tractively coupled beneath the frame, and means providing a driving connection between the engine and driven mower; coupling means articulately connecting one of the mower units to each of the draft beams; a gas tank mounted on the draft frame; and flexible conduits interconnecting the gas tank with each of the engines.

15. The combination set forth in claim 14 wherein a control console is mounted on and projects forwardly from the draft frame to a position adjacent the tractor operator's station when the draft frame is secured to the rear of the tractor, and controls on the control console are interconnected with the mower unit engines by flexible lines.

16. The combination set forth in claim 15 wherein each of the coupling means is slidably mounted on its respective draft beam and a power means is operatively connected between each draft beam and associated coupling means to forceably slide the coupling means along their respective draft beams and move the mower units between normal working positions and transport positions.

References Cited
UNITED STATES PATENTS

| | | | |
|---|---|---|---|
| 2,058,048 | 10/1936 | Worthington | 56—7 |
| 3,135,079 | 6/1964 | Dunn | 56—6 |
| 3,236,034 | 2/1966 | Blettner | 56—6 |
| 3,503,189 | 3/1970 | Erdman | 56—12.6 |
| 3,514,126 | 5/1970 | Fuss | 56—6X |

RUSSELL R. KINSEY, Primary Examiner